United States Patent [19]

Ueda et al.

[11] 3,922,667

[45] Nov. 25, 1975

[54] IMAGE OR SEGMENT PATTERN FORMING X-Y MATRIX ADDRESSING METHOD

[75] Inventors: Fumio Ueda, Nishinomiya; Hirotsugu Arai, Takatsuki, both of Japan

[73] Assignee: Mitsubishi Denki Kabushiki Kaisha, Tokyo, Japan

[22] Filed: Mar. 20, 1974

[21] Appl. No.: 453,066

[30] Foreign Application Priority Data

Mar. 27, 1973 Japan ............................ 48-35221

[52] U.S. Cl. ...................... 340/324 M; 350/160 LC

[51] Int. Cl.[2] ........................................ G02F 1/18

[58] Field of Search ..... 340/324 R, 324 M, 166 EL, 340/343, 336; 350/160 LC

[56] References Cited

UNITED STATES PATENTS

| | | | |
|---|---|---|---|
| 2,817,815 | 12/1957 | Evans | 340/324 R |
| 3,654,606 | 4/1972 | Marlowe et al. | 340/324 M |
| 3,744,878 | 7/1973 | Kiemle et al. | 340/324 M |
| 3,750,136 | 7/1973 | Roess | 340/324 R |
| 3,776,615 | 12/1973 | Tsukamoto | 340/324 M |
| 3,824,003 | 7/1974 | Koda et al | 340/324 R |

OTHER PUBLICATIONS

*Two Frequency, Compensated Threshold Multiplexing of Liquid Crystal Displays;* Alt et al., IBM Tech. Discl. Bull., Vol. 16, No. 5, pp. 1578–1581; Oct. 1973.

*Primary Examiner*—Marshall M. Curtis

*Attorney, Agent, or Firm*—Oblon, Fisher, Spivak McClelland & Maier

[57] ABSTRACT

An X-Y matric addressing method in which M numbers of electrodes $X_1$ through $X_M$ are arranged in an X column, and N numbers of electrodes $Y_1$ through $Y_N$ are arranged in a Y row, intersecting perpendicularly with the X-column electrodes, having the steps of applying scanning voltages $e_{Y1}$ through $e_{YN}$ to the N number of Y-row electrodes at a cycle T seconds; applying signal voltages $e_{X1}$ through $e_{XM}$ to the M number of X-column electrodes; applying a voltage $e_{Xi} - e_{Yj}$ to a matrix cell $P_{ij}$ formed in the region where an arbitrary one $X_i$ of the M number of X-column electrodes intersects with an arbitrary one $Y_j$ of the N number of Y-row electrodes, in response to the timings of the bit state of the signal voltage and the bit state of the scanning voltage, thereby causing the X-Y matrix cells to exhibit a response in the form of an image or segment pattern; and, determining the bit states of the scanning voltage $e_{Yj}$ and of the signal voltage $e_{Xi}$ so that the voltage $e_{Yj}$ assumes the bit state "1" for the period of (T/N) seconds at the cycle T and the bit state "0" for the rest of the period T − (T/N) seconds, and the voltage $e_{Xi}$ assumes the bit state 1 or 0 according to the bit state matrix cell $S_{ij}$ of an arbitrary signal, the scanning voltage $e_{Yj}$ is $E_{OY} - (V_1/2)$ for the first half of the bit state 1 of the scanning voltage $e_{Yj}$ and is $E_{OY} + (V_1/2)$ for the latter half of the bit state 1 where $E_{OY}$ stands for an arbitrary potential value, and $V_1$ for a voltage with an arbitrary polarity and value and further the scanning voltage $e_{Yj}$ is $E_{OY}$ for the period where the bit state of the scanning voltage $e_{Yj}$ is 0, while, the signal voltage $e_{Xi}$ is $E_{OX} + (V_2/2)$ for the first half of the bit state 1 of the signal voltage $e_{Xi}$ and is $E_{OX} - (V_2/2)$ for the latter half of the bit state 1 where $E_{OX}$ stands for an arbitrary potential value, and $V_2$ for a voltage with an arbitrary polarity and value.

6 Claims, 8 Drawing Figures

IMAGE OR SEGMENT PATTERN FORMING X-Y MATRIX ADDRESSING METHOD

BACKGROUND OF THE INVENTION

1. Field of the Invention

The present invention relates to an X-Y matrix addressing method suitable for applications of image displaying, and more particularly to an X-Y matrix addressing method capable of improving the quality of the image displayed.

2. Description of the Prior Art

Referring to FIG. 1, a prior art projection type display device pertaining to one aspect of the invention is schematically illustrated, wherein light beams from a light source 1 are made parallel with each other through a lens 2, passed through a polarizer 3, a liquid crystal cell 4, an analyzer 5, and then projected on a screen 7 through a lens 6. The liquid crystal cell 4 is driven by a voltage from a drive circuit 8.

The liquid crystal cell 4 is one whose molecule orientation is controllable by an electric field. The apparent birefringence of the cell is nearly totally dependent upon the effective value of the voltage applied in the range where the frequency $f$ (1/T Hz) of the voltage applied is comparatively higher than the response of the liquid crystal molecular structure to the voltage applied. An example shown in FIG. 1 is of a two-tone display device using an X-Y matrix electrode structure.

In FIG. 1, a glow discharge type multi-figure numeric display tube comprising X-Y matrix cells or segment type X-Y matrix electrodes is assumed. Signal voltages $e_{X1}$ through $e_{XM}$ are applied to X electrodes $X_1$ through $X_M$ respectively from the drive circuit 8, and scanning voltages $e_{Y1}$ through $e_{YN}$ are applied to Y electrodes $Y_1$ through $Y_N$ from the drive circuit 8. Then the voltage applied to the points where the X electrodes $X_1$ through $X_M$ in one dimension on the matrix intersect with the Y electrodes $Y_1$ through $Y_N$ in the other dimension, is $e_{Xi} - e_{Yj}$; that is, the voltage $e_{Xi} - e_{Yj}$ is applied to an arbitary matrix cell $P_{ij}$.

In this example, the X-Y matrix cell depends on the effective value of the voltage applied. The effective value $E_{ij}$ is $$E_{ij} = \sqrt{\frac{1}{T} \int_{t_0}^{t_0 + T} (e_{Xi} - e_{Yj})^2 \, dt}$$

This expression shows that the effective value $E_{ij}$ varies according to the bit state of the signal voltage $e_{Xi}$ which contains the display signal. This is why a pattern to be displayed cannot stably be displayed in two tones.

Another prior art example of a display device comprises X-Y matrix electroluminescent cells which are responsive at a high speed, dependent on the waveform of the voltage applied. This device, however, is also incapable of maintaining stable response for desirable two-tone display even if the voltages $e_{Yj}$ and $e_{Xi}$ are applied as burst voltages because the prior art matrix cell depends on the effective value which is inevitably variable.

SUMMARY OF THE INVENTION

Therefore, an object of the present invention is to provide new and improved unique X-Y matrix addressing method for an X-Y matrix display device comprising liquid crystal cell electrodes, wherein a phase-modulated bipolar binary voltage is applied to the X-axis electrodes, a voltage having a suitable waveform is applied to the Y-axis electrode, the effective value $E_{ij}$ of the voltage $e_{Xi} - e_{Yj}$ is caused to correspond exactly to a bit state matrix $S_{ij}$, and thus the response quality of the X-Y matrix cell is improved.

Briefly, in accordance with the present invention the foregoing and other objects are attained in one aspect by the provision of an X-Y matrix addressing method for an X-Y matrix device comprising liquid crystal cell electrodes wherein a phase-modulated bipolar binary voltage is applied to the X-axis electrode, a voltage having a suitable waveform is applied to the Y-axis electrode and the effective value $E_{ij}$ of the voltage $e_{Xi} - e_{yj}$ is caused to correspond exactly to a bit state matrix $S_{ij}$, and thus the response quality of the X-Y matrix is improved.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings, wherein.

DETAILED DESCRIPTION OF THE PREFERRED EMBODIMENTS

Figure 1:
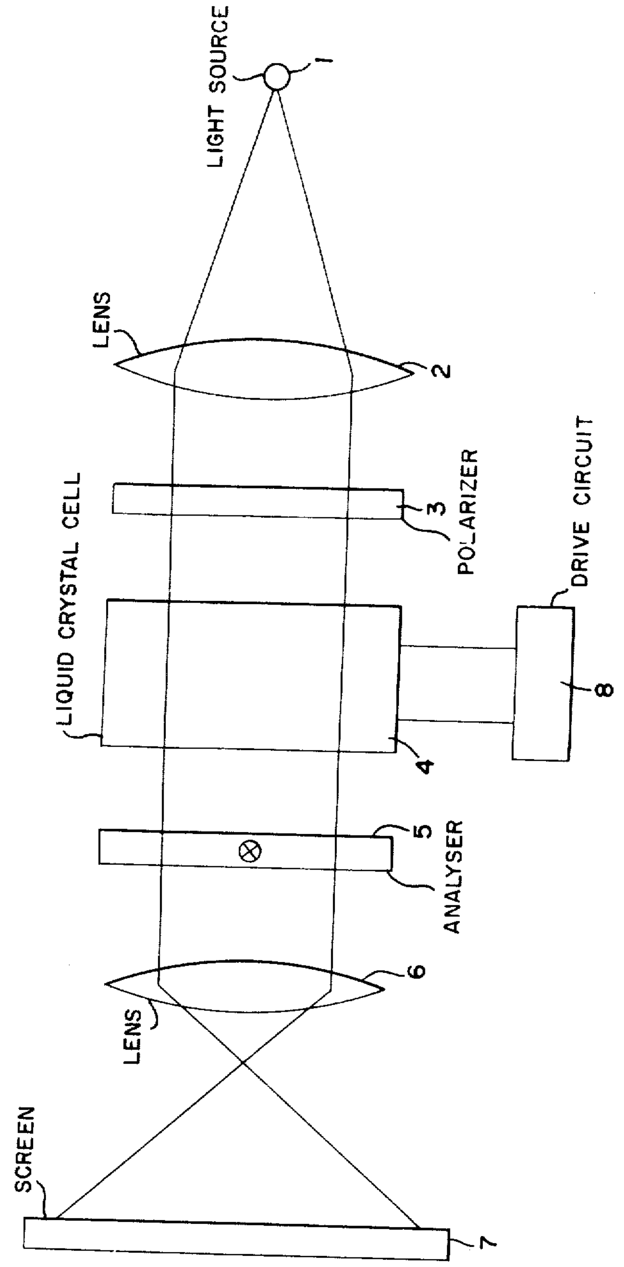
FIG. 1 is a schematic illustration of a display device using liquid crystal cells, which pertains to one embodiment of an X-Y matrix addressing method of the invention.
Figure 2:
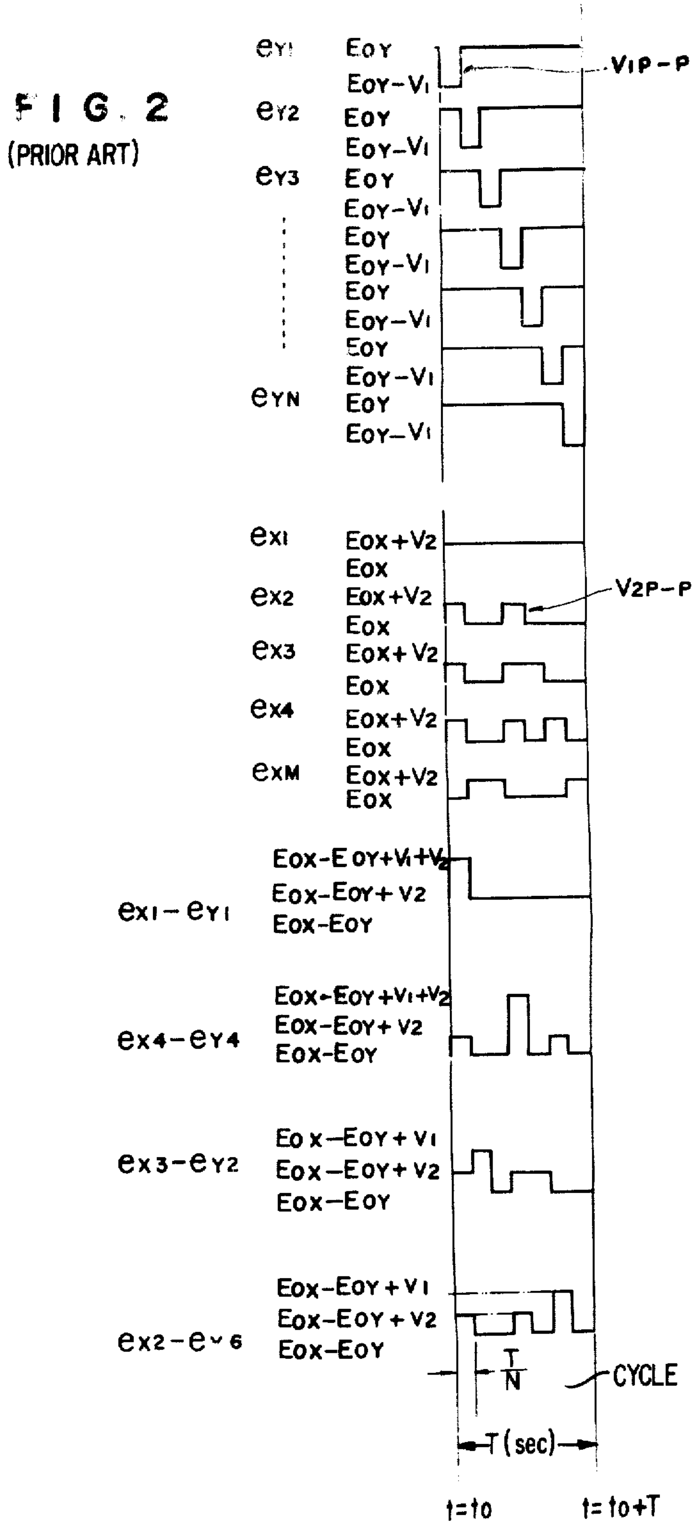
FIG. 2 (PRIOR ART)
FIG. 2 is a time chart showing waveforms of voltages applied to electrode structure matrix cells which constitute a general prior art X-Y matrix device.
Figure 3:
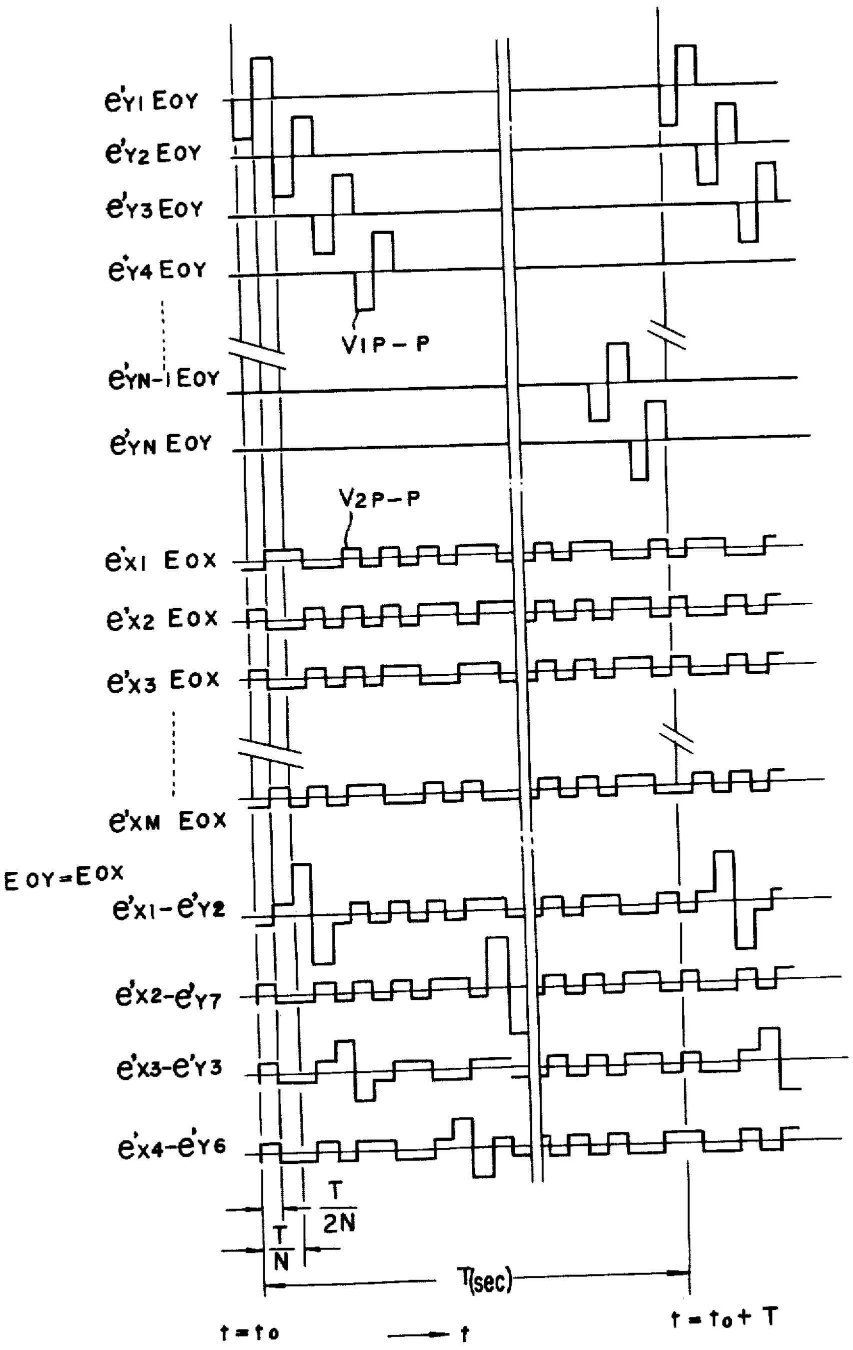
FIG. 3 is a time chart showing voltages applied to X-Y matrix cells according to an X-Y matrix addressing method of this invention.

An X-Y matrix display device operated according to one embodiment of the invention is schematically illustrated in FIGS. 1 and 3. This matrix comprises effective value dependent type liquid crystal cells serving as electrodes, M numbers along the X-axis, and N numbers along the Y-axis, to which suitable voltages are applied. FIG. 3 shows waveforms of these voltages.

Referring to FIG. 3, signal voltages $e'_{X1}$ through $e'_{XM}$ with peak-to-peak voltage $V_2$ are applied to the X-axis electrodes $X_1$ through $X_M$, while, scanning voltages $e'_{Y1}$ through $e'_{YN}$ with peak-to-peak voltage $V_1$ are applied to the Y-axis electrodes $Y_1$ through $Y_N$.

Figure 4:
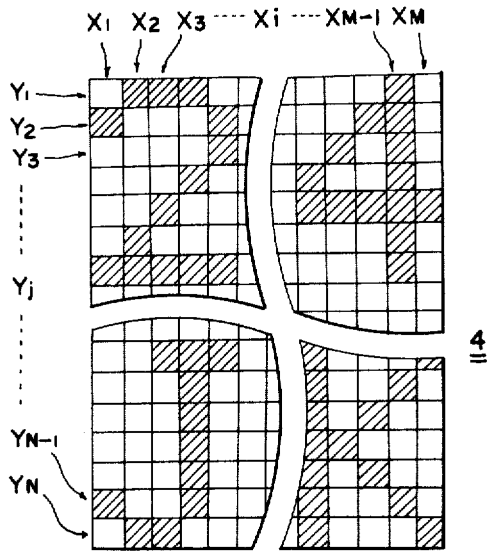
FIG. 4 is a graphic diagram showing a pattern displayed in response to a signal voltage $e_{Xi}$ (FIG. 3) in an MxN matrix cell arrangement driven by the X-Y matrix addressing method of this invention.

These signal and scanning voltages are supplied from the drive circuit 8. FIG. 4 shows an X-Y matrix arrangement comprising X-axis electrodes $X_1$ through $X_M$ and Y-axis electrodes $Y_1$ through $Y_N$, which respond to signal voltages and scanning voltages whose waveforms are as shown in FIG. 3.

The liquid crystal cells 4, when given signal and scanning voltages, offer different responses as the result of the fact that these crystal cells have different birefringences. These responses are projected as a visible pattern on the screen 7 of a display device as in FIG. 1.

Voltages $e'_{Xi}$ and $e'_{Yj}$ are applied from the drive circuit 8 to an arbitrary electrode $X_i$ of the X-axis electrodes $X_1$ through $X_M$ and to an arbitrary electrode $Y_j$ of the Y-axis electrodes $Y_1$ through $Y_N$ respectively. This then means that a voltage $e'_{Xi} - e'_{Yj}$ is applied to the intersection of $X_i$ and $Y_j$, that is, to a matrix cell $P_{ij}$ which is shown in FIG. 4 as a crystal layer located between electrodes $X_i$ and $Y_j$.

Figure 5:
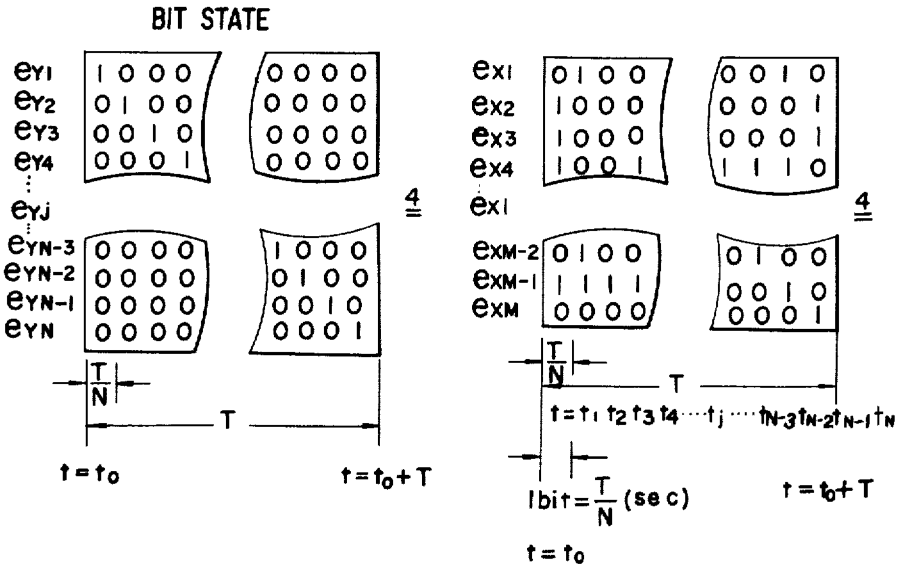
FIG. 5 is a diagram showing bit states of signal voltages applied to an MxN matrix cell.

From the equation, $$E'_{ij} = \sqrt{\frac{1}{T}\int_{t_0}^{t_0+T} (e'_{Xi} - e'_{Yj})^2\, dt,}$$

which determines the effective value $E'_{ij}$ of the voltage applied to the matrix cell $P_{ij}$ (where $i = 1, 2, ..., M$, and $j = 1, 2, ..., N$), the effective value $E'_s$ of the voltage applied to one of the matrix cells which constitute a pattern comprising hatched portions (FIG. 4) is given below, corresponding to the X-Y signal bit state matrix $S_{ij}$ which expresses the bit state of $e_{Xi}$ and $e_{Yj}$ as shown in FIG. 5.

$$E'_s = \sqrt{\frac{1}{T}\left\{\left(\frac{V_1 + V_2}{2}\right)^2 \frac{T}{N} + \left(\frac{V_2}{2}\right)^2 \left(T - \frac{T}{N}\right)\right\}}$$

In FIG. 5, T stands for a refresh cycle.

The effective value $E'_u$ of the voltage applied to the matrix is given as follows with respect to any other cell.

$$E'_u = \sqrt{\frac{1}{T}\left\{\left(\frac{V_1 + V_2}{2}\right)^2 \frac{T}{N} + \left(\frac{V_2}{2}\right)^2 \left(T - \frac{T}{N}\right)\right\}}$$

Thus, according to the method of this invention, the effective values $E'_s$ and $E'_u$ can be made constant regardless of the state of the matrix cell driven in response to the voltage applied.

In the display device (FIG. 1), for example, where liquid crystal cells 4 are used, the response of the matrix to effective values $E'_s$ and $E'_u$ is constant, that is, the birefringence thereof is constant, with the result that the quality of a pattern projected on the screen 7, or the quality of the matrix response is much improved.

In FIG. 3, $e'_{X1} - e'_{Y2}$ and $e'_{X2} - e'_{Y7}$ denote typically the voltages which are applied to two of the matrix cells driven in response to the effective value $E'_s$.

Similarly, FIG. 3 shows the voltages $e'_{X3} - e'_{Y3}$ and $e'_{X4} - e'_{Y6}$ which correspond to the effective value $E'_u$.

Figure 6:
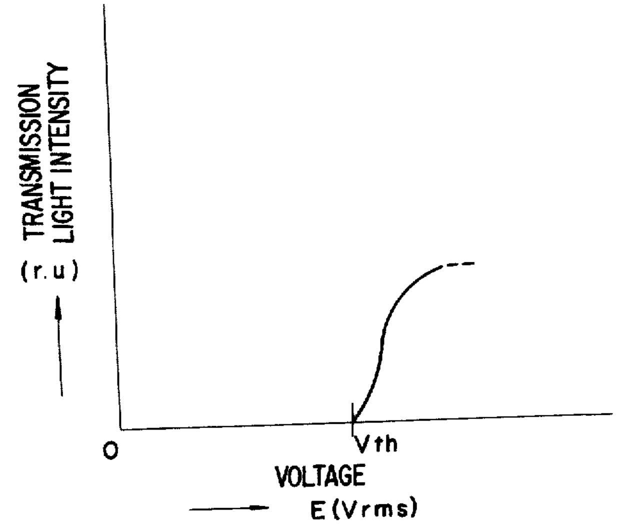
FIG. 6 is a graphic diagram showing the voltage versus transmission light intensity characteristic of a device using liquid crystal cells of the type whose birefringence depends on the effective value of the voltage applied according to the X-Y matrix addressing method of the present invention.

FIG. 6 shows an effective value versus transmission light intensity characteristic curve taken in a practical frequency range on a display device comprising X-Y matrix cells such as liquid crystal cells or electroluminescent cells.

In FIG. 6, the abscissa stands for the voltage E (V rms), and the ordinate for the light intensity (*ru*). The characteristic curve indicates that, for good contrast of a picture formed on the screen 7 and for high extinction ratio in the application where the matrix device is used as a light shutter, the effective value $E'_u$ should be slightly lower than the threshold voltage $V_{th}$, and the effective value $E'_s$ should be as high as possible above the threshold voltage $V_{th}$.

The relationship between the voltages $V_1$ and $V_2$ for maximizing the voltage contrast K ($=E'_s/E'_u$) under the condition that $E_{OX} = E_{OY}$, i.e., when the matrix is driven with AC voltage, is $V_2 = \sqrt{N} \cdot V_2$. When this relationship holds, the voltage contrast is maximum:

$$Km = \sqrt{\frac{\sqrt{N}+1}{\sqrt{N}-1}}.$$

In other words, the voltage contrast K can be maximized in this matrix method if the condition, $V_1 = \sqrt{N} \cdot V_2$ is maintained. Thus it will become possible to maximized in this matrix method if the condition, $V_1 = \%N \cdot V_2$ is maintained. Thus it will become possible to maximize the effective-value-dependent contrast between the liquid crystal matrix cells.

A second embodiment of the invention will now be described hereinafter. The voltage $e_{Yj}$ applied to the Y-axis electrode $Y_j$, and the voltage $e_{Xi}$ applied to the X-axis electrode are of a square waveform, $$\frac{\text{one cycle}}{\text{one bit time}\ \left\{\frac{T}{N}[\text{sec.}]\right\}} \qquad (1)$$

Figure 7:
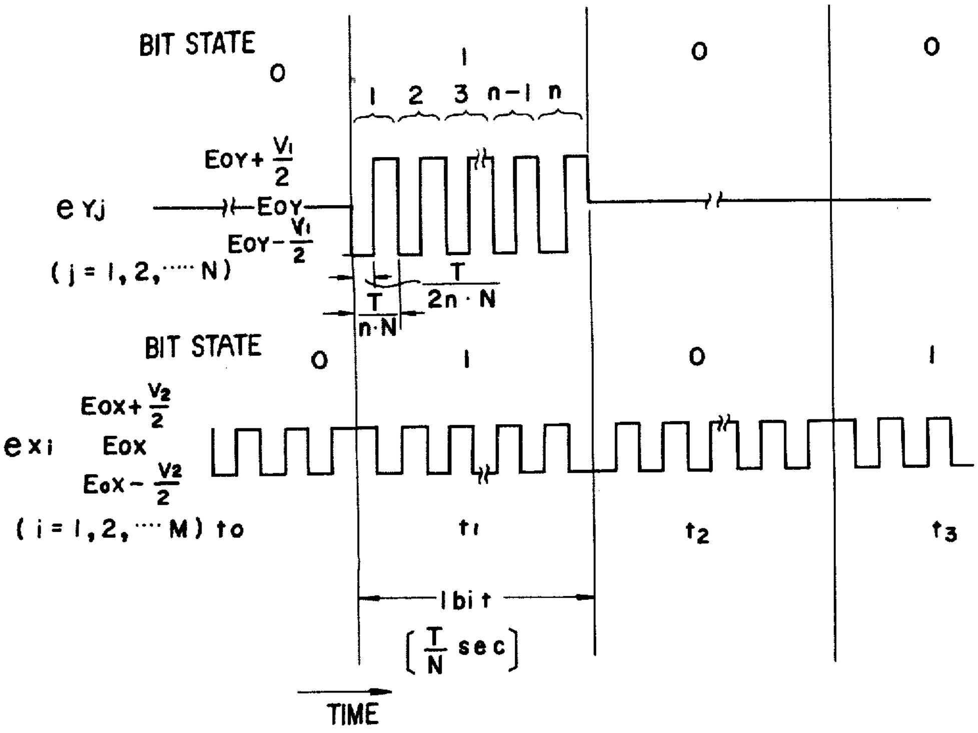
FIG. 7 is a diagram showing waveforms of the scanning voltage and signal voltage used in another embodiment of an X-Y matrix addressing method of this invention.

(where N stands for the number of Y electrodes). It should be understood, however, that these voltages may be of other square waveforms such as $$\frac{n\ \text{cycle}}{\text{one bit time}\ \left\{\frac{T}{N}[\text{sec.}]\right\}} \qquad (2)$$

as shown in FIG. 7, so that the bit state is given in terms of the phase state.

This method is useful when the liquid crystal cell is dependent also on frequencies in a practical range. This is because the frequency spectra of the voltages applied to the matrix cell $P_s$ which corresponds to the effective value $E'_s$ and to the matrix cell $P_u$ which corresponds to the effective value $E'_u$ become more similar as the value of n increases.

The description of a third embodiment of the invention will follow hereinafter. The foregoing embodiments pertain to a matrix display for binary patterns where the signal bit state is either "1" or "0" which represents the selection or unselection of a matrix cell. These embodiments may be modified to be capable of half-tone response on the matrix.

Figure 8:
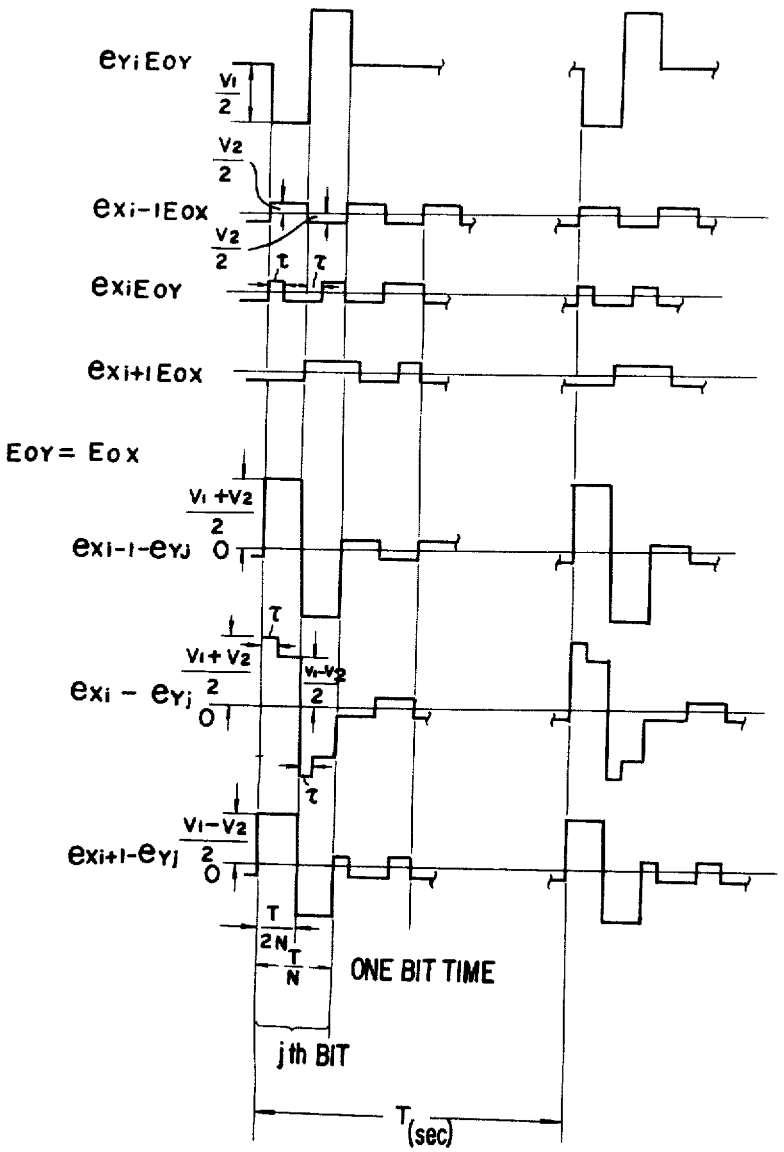
FIG. 8 is a diagram showing voltage waveforms used in connection with display for half-tone response in another embodiment of the X-Y matrix addressing method of the present invention.

FIG. 8 shows an example of arrangement for operation where the voltage of $$\frac{\text{one cycle}}{\text{one bit time}}$$

is used as in the second embodiment. The bit state of the $j$-th bit of $e_{Xi}$ is an intermediate state "$\alpha$" between 1 and 0 where $0 \leqq \alpha \leqq 1$. In FIG. 8, $\tau = (T/2N)\alpha$sec where $\tau$ is 0.4.

In this embodiment, the effective value $E'_{ij}$ of the voltage applied to the matrix cell $P_{ij}$ is $$E'_{ij} = \sqrt{\frac{1}{T}\left\{\left(\frac{V_1}{2}+\frac{V_2}{2}\right)^2\frac{T\alpha}{N}+\left(\frac{V_1}{2}-\frac{V_2}{2}\right)^2\frac{T(1-\alpha)}{N}+\left(\frac{V_2}{2}\right)^2\left(T-\frac{T}{N}\right)\right\}} \quad (3)$$

Thus, in this embodiment also, the effective value of a voltage in the range ($E'_u \leqq E'_{ij} \leqq E'_s$) can be applied to an arbitrary matrix cell $P_{ij}$ without depending on the bit state matrix $S_{ij}$.

This advantage is also available in the second embodiment when only the $n\alpha$ cycle of the n cycle of the signal voltage $e_{Xi}$ is set to a phase state corresponding to the bit state 1, and the rest of the $n$ cycle, i.e., $n(1-\alpha)$ cycle, is set to a phase state corresponding to the bit state 0 (in this instance, $\alpha$ is determined so that $N\alpha$ assumes a positive integer).

According to the method as in the third embodiment, the effective value $E'_{ij}$ can be arbitrarily determined within the range, $E'_u \leqq E'_{ij} \leqq E'_s$ and hence an arbitrary matrix cell can be addressed by the effective value which comes in this range. Accordingly, a device capable of complete half-tone display can be realized if such device comprises the X-Y matrix cells which exhibit a characteristic having a definite threshold voltage $V_{th}$ as shown in FIG. 6. Generally, an X-Y matrix cell arrangement capable of providing a stable tone in response to the effective value can be realized with the method of the invention.

A fourth embodiment of the invention pertains to a matrix addressing method applicable to a display device comprising X-Y matrix cells of electrode structure, although this embodiment is not always effectively applicable to a display device comprising multiple connection type X-Y matrix cells of electrode structure, such as a glow discharge type display tube arrangement, operable in a voltage versus light intensity characteristic with a definite threshold voltage $V_{th}$ (FIG. 6), in which the glow light intensity is given in terms of a binary state, on and off.

For example, assume that the matrix cell $P_{ij}$ located at the intersection of the X-axis electrode $X_i$ and the Y-axis electrode $Y_j$ is a heater with resistance R ($\Omega$), and that a voltage whose effective value is $E_{ij}$ is applied to the matrix cell $P_{ij}$ in the manner as described above. Then the matrix cell $P_{ij}$ receives the power $W_{ij} = (E'_{ij}{}^2/R)$ (watt). Thus the effective value $E_{ij}$ corresponding to $Q_{ij}$, the effective value corresponding to $E_{ij}$, and the temperature $T_{ij}$ of the heater $P_{ij}$ corresponding to $W_{ij}$ can be arbitrarily determined according to the condition $T_u \leqq T_{ij} \leqq T_s$ (where $T_u$ and $T_s$ may be given corresponding to $E_u$ and $E_s$). By the use of this arrangement, it becomes possible to realize "write" into X-Y matrix cells with high liberty, the X-Y matrix being constituted of the foregoing heater matrix cells and elements capable of exhibiting various tones in color or brightness in response to temperature variations.

When the polarities of the voltages $V_1$ and $V_2$ (FIG. 3) are inverted, that is, when the phase of the voltage $e_{Xi}$ is deviated from that of the voltage $e_{Yj}$ by T seconds, the responsive pattern of the X-Y matrix cells is also inverted. It is readily apparent that the invention can be applied to this modified arrangement. The invention can also be applied to an X-Y matrix cell arrangement (or device) comprising figure electrodes and segment electrodes.

According to the invention, as has been described in detail, the response of the matrix element of an X-Y matrix arrangement comprising electrodes in X and Y directions can be arbitrarily determined within a range of values dependent on the number of Y electrodes (i.e., scanning electrodes) used, and thus the quality of the responding state of the X-Y matrix cell can be markedly improved. Therefore the X-Y matrix addressing method of this invention is highly useful for applications to a display device where high quality picture is important.

While the invention has been described in its preferred embodiments, it is to be understood that modifications will occur to those skilled in the art without departing from the scope of the invention as determined by the appended claims.

What is claimed as new and desired to be secured by letters patent of the United States is:

1. An X-Y matrix addressing method in which M numbers of electrodes $X_1$ through $X_M$ are arranged in an X column, and N numbers of electrodes $Y_1$ through $Y_N$ are arranged in a Y row, intersecting perpendicularly with the X-column electrodes, comprising the steps of:

applying scanning voltages $e_{Y1}$ through $e_{YN}$ to the N number of Y-row electrodes at a cycle T seconds;

applying signal voltages $e_{X1}$ through $e_{XM}$ to the M number of X-column electrodes;

applying a voltage $e_{Xi} - e_{Yj}$ to a matrix cell $P_{ij}$ formed in the region where an arbitrary one $X_i$ of the M number of X-column electrodes intersects with an arbitrary one $Y_j$ of the N number of Y-row electrodes, in response to the timings of the bit state of the signal voltage and the bit state of the scanning voltage, thereby causing the X-Y matrix cells to exhibit a response in the form of an image or segment pattern; and, determining the bit states of the scanning voltage $e_{Yj}$ and of the signal voltage $e_{Xi}$ so that the voltage $e_{Yj}$ assumes the bit state 1 for the period of (T/N) seconds at the cycle T and the bit state 0 for the rest of the period T − (T/N) seconds, and the voltage $e_{Xi}$ assumes the bit state 1 or 0 according to the bit state matrix cell $S_{ij}$ of an arbitrary signal, the scanning voltage $e_{Yj}$ is $E_{OY} - (V_1/2)$ for the first half of the bit state 1 of the scanning voltage $e_{Yj}$ and is $E_{OY} + (V_1/2)$ for the latter half of the bit state 1 where $E_{OY}$ stands for an arbitrary potential value, and $V_1$ for a voltage with an arbitrary polarity and value, and further the scanning voltage $e_{Yj}$ is $E_{OY}$ for the period where the bit state of the scanning voltage $e_{Yj}$ is 0, while, the signal voltage $e_{Xi}$ is $E_{OX} + (V_2/2)$ for the first half of the bit state 1 of the signal voltage $e_{Xi}$ and is $E_{OX} - (V_2/2)$ for the latter half of the bit state 1 where $E_{OX}$ stands for an arbitrary potential value, and $V_2$ for a voltage with an arbitrary polarity and value.

2. An X-Y matrix addressing method as claimed in claim 1 further comprising the step of making the voltage $V_1$ nearly equal to $\sqrt{N} \cdot V_2$.

3. An X-Y matrix addressing method in which M numbers of electrodes $X_1$ through $X_M$ are arranged in an X column, and N numbers of electrodes $Y_1$ through $Y_N$ are arranged in a Y row, intersecting perpendicularly with the X-column electrodes, comprising the steps of:

applying scanning voltages $e_{Y1}$ through $e_{YN}$ to the N number of Y-row electrodes at a cycle T seconds;

applying signal voltages $e_{X1}$ through $e_{XM}$ to the M number of X-column electrodes;

applying a voltage $e_{Xi} - e_{Yj}$ to a matrix cell $P_{ij}$ formed in the region where an arbitrary one $X_i$ of the M number of X-column electrodes intersects with an arbitary one $Y_j$ of the N number of Y-row electrodes, in response to the timings of the bit state of the signal voltage and the bit state of the scanning voltage, thereby causing the X-Y matrix cells to exhibit a response in the form of an image or segment pattern; and, determining the bit states of the scanning voltage $e_{Yj}$ and of the signal voltage $e_{Xi}$ so that the voltage $e_{Yj}$ assumes the bit state 1 for the period of (T/N) seconds at the cycle T and the bit state 0 for the rest of the period T − (T/N) seconds, and the voltage $e_{Xi}$ assumes the bit state 1 or 0 according to the bit state matrix cell $S_{ij}$ of an arbitrary signal, the scanning voltage $e_{Yj}$ occurs at two potentials $E_{OY} - (V_1/2)$ and $E_{OY} + (V_1/2)$ where $E_{OY}$ stands for an arbitrary potential value, and $V_1$ for a voltage with an arbitrary polarity and value alternately n times repeatedly at the cycle $(T/n \cdot N)$ seconds where $n$ is an integer excepting 0 and 1, in a square waveform beginning with $E_{OY} - (V_1/2)$, during the bit state 1 of the scanning voltage $e_{Yj}$, or the scanning voltage $e_{Yj}$ occurs at a potential $E_{OY}$ during the bit state 0 of the scanning voltage $e_{Yj}$, while the signal voltage $e_{Xi}$ occurs at two potentials $E_{OX} + (V_2/2)$ and $E_{OX} - (V_2/2)$ where $E_{OX}$ stands for an arbitrary potential value, and $V_2$ for a voltage with an arbitrary polarity and value alternately $n$ times repeatedly at the cycle $(T/n \cdot N)$ seconds where $n$ is an integer excepting 0 and 1, in a square waveform beginning with $E_{OX} + (V_2/2)$, during the bit state 1 of the signal voltage $e_{Xi}$, or the signal voltage $e_{Xi}$ occurs at two potentials $E_{OX} - (V_2/2)$ and $E_{OX} + (V_2/2)$ alternately at the cycle $(T/n \cdot N)$ seconds, in a square waveform beginning with $E_{OX} - (V_2/2)$, during the bit state 0 of the signal voltage $e_{Xi}$.

4. An X-Y matrix addressing as claimed in claim 3 further comprising the step of making the voltage $V_1$ nearly equal to $\sqrt{N} \cdot V_2$.

5. An X-Y matrix addressing method in which M numbers of electrodes $X_1$ through $X_M$ are arranged in an X column, and N numbers of electrodes $Y_1$ through $Y_N$ are arranged in a y row, intersecting perpendicularly with the X-column electrodes, comprising the steps of:

applying scanning voltages $e_{Y1}$ through $e_{YN}$ to the N number of Y-row electrodes at the cycle T second;

applying signal voltages $e_{X1}$ through $e_{XM}$ to the M number of X-column electrodes;

applying a voltage $e_{Xi} - e_{Yj}$ to a matrix cell $P_{ij}$ formed in the region where an arbitrary one $X_i$ of the M number of X-column electrodes intersects with an arbitrary one $Y_j$ of the N number of Y-row electrodes, in response to the timings of the bit state of the signal voltage and the bit state of the scanning voltage, thereby causing the X-Y matrix cells to exhibit a response in the form of an image or segment pattern; and, determining the bit states of the scanning voltage $e_{Yj}$ and of the signal voltage $e_{Xi}$ so that the voltage $e_{Yj}$ assumes the bit state 1 for the period of (T/N) seconds at the cycle T and the bit state 0 for the rest of the period T − (T/N) seconds, and the voltage $e_{Xi}$ assumes the bit state 1 or 0 according to the bit state matrix cell $S_{ij}$ of an arbitrary signal, the scanning voltage $e_{Yj}$ occurs at two potentials $E_{OY} - (V_1/2)$ and $E_{OY} + (V_1/2)$ where $E_{OY}$ stands for an arbitrary potential value, and $V_1$ for a voltage with an arbitrary polarity and value alternately $n$ times repeatedly at the cycle $(T/n \cdot N)$ seconds where $n$ is an integer excepting 0 and 1, under the condition that the signal voltage $e_{Xi}$ assumes a bit state including 1 and 0 or an arbitrary intermediate bit state $\alpha/n$ (where $0 \leq \alpha \leq 1$), or the scanning voltage $e_{Yj}$ occurs at $E_{OY}$ when its bit state is 0, while the signal voltage $e_{Xi}$ occurs at two potentials $E_{OX} + (V_2/2)$ and $E_{OX} - (V_2/2)$ where $E_{OX}$ stands for an arbitrary potential value, and $V_2$ for a voltage with an arbitrary polarity and value alternately for $(T/n \cdot N)\alpha$ seconds repeatedly at the cycle $(T/n \cdot N)$ seconds, and for the rest of the time $$\frac{T}{n}\left(1 - \frac{\alpha}{n}\right) \text{ seconds}$$

of the bit repeatedly at the cycle $(T/n \cdot N)$ seconds when the bit state of the signal voltage $e_{Xi}$ is $(\alpha/n.)$

6. An X-Y matrix addressing method as claimed in claim 5 further comprising the step of making the voltage $V_1$ nearly equal to $\sqrt{N} \cdot V_2$.

* * * * *